United States Patent
Fang et al.

(10) Patent No.: US 11,541,499 B2
(45) Date of Patent: Jan. 3, 2023

(54) INDEXABLE MILLING CUTTER WITH PRECISE COOLANT STREAMS

(71) Applicant: Kennametal Inc., Latrobe, PA (US)

(72) Inventors: Xiangdong D. Fang, Greensburg, PA (US); Jean-Luc D. Dufour, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 89 days.

(21) Appl. No.: 16/749,638

(22) Filed: Jan. 22, 2020

(65) Prior Publication Data
US 2021/0220956 A1 Jul. 22, 2021

(51) Int. Cl.
| B23Q 11/10 | (2006.01) |
| B23C 5/28 | (2006.01) |
| B23C 5/10 | (2006.01) |
| B23C 5/20 | (2006.01) |

(52) U.S. Cl.
CPC .......... *B23Q 11/1015* (2013.01); *B23C 5/109* (2013.01); *B23C 5/28* (2013.01); *B23C 5/20* (2013.01); *B23C 2210/00* (2013.01)

(58) Field of Classification Search
CPC .. B23C 5/26; B23C 5/28; B23Q 11/10; B23Q 11/1015; B23Q 11/1023; B23B 27/10
See application file for complete search history.

(56) References Cited

U.S. PATENT DOCUMENTS

| 3,293,727 A | 12/1966 | Simms |
| 4,929,131 A * | 5/1990 | Allemann ........... B23B 31/1075 279/8 |
| 5,288,186 A * | 2/1994 | Kovacevic ................ B23C 5/28 407/11 |
| 5,346,335 A | 9/1994 | Harpaz et al. |
| 5,439,327 A | 8/1995 | Wertheim |
| 5,718,156 A | 2/1998 | Lagrolet et al. |

(Continued)

FOREIGN PATENT DOCUMENTS

| DE | 37 40814 A1 | 6/1989 |
| DE | 3740814 A1 | 6/1989 |

(Continued)

OTHER PUBLICATIONS

English translation of Official Action from German Patent Office dated Sep. 28, 2021.

(Continued)

*Primary Examiner* — Nicole N Ramos

(57) ABSTRACT

An indexable milling cutter includes a milling cutter body with a plurality of flutes and a plurality of seating surfaces adapted to mount a cutting insert thereon. The milling cutter body includes a plurality of coolant reservoirs in fluid communication with an adapter. In one aspect, each coolant reservoir lies along a circular intersection line of a coolant manifold. In another aspect, a longitudinal axis of each coolant reservoir is oriented at a non-zero angle, A, with respect to a central, longitudinal axis of the milling cutter. A plurality of coolant ducts in fluid communication with each coolant reservoir, each coolant duct having a smaller cross-sectional area than the coolant reservoir, provide multiple streams of coolant targeted at a plurality of specific critical cutting areas of the cutting insert.

22 Claims, 11 Drawing Sheets

(56) References Cited

U.S. PATENT DOCUMENTS

| | | | |
|---|---|---|---|
| 5,901,623 A | 5/1999 | Hong | |
| 6,652,200 B2 | 11/2003 | Kraemer | |
| 7,384,219 B2 | 6/2008 | Weidmer | |
| 7,625,157 B2 | 12/2009 | Prichard et al. | |
| 7,802,947 B2 | 9/2010 | Endres | |
| 7,963,729 B2 | 6/2011 | Prichard et al. | |
| 7,997,832 B2 | 8/2011 | Prichard et al. | |
| 3,061,241 A1 | 11/2011 | Rozzi et al. | |
| 8,061,241 B2 | 11/2011 | Rozzi et al. | |
| 8,079,783 B2 | 12/2011 | Prichard et al. | |
| 8,079,784 B2 | 12/2011 | Prichard et al. | |
| 8,439,609 B2 | 5/2013 | Woodruff et al. | |
| 9,238,273 B2* | 1/2016 | Lehto | B23C 5/26 |
| 9,434,011 B2 | 9/2016 | Morrison et al. | |
| 9,931,699 B2 | 4/2018 | Kitagawa | |
| 2002/0106251 A1* | 8/2002 | Ripley | B23C 5/28 |
| | | | 407/35 |
| 2003/0082018 A1 | 5/2003 | Kraemer | |
| 2007/0274793 A1 | 11/2007 | Weidmer | |
| 2008/0279644 A1 | 11/2008 | Endres | |
| 2009/0226268 A1* | 9/2009 | Pilkington | B23C 5/28 |
| | | | 407/113 |
| 2010/0254772 A1 | 10/2010 | Rozzi et al. | |
| 2012/0082518 A1 | 4/2012 | Woodruff et al. | |
| 2012/0230781 A1* | 9/2012 | Hoffer | B23Q 11/1023 |
| | | | 407/11 |
| 2015/0352640 A1* | 12/2015 | Frota de Souza Filho | |
| | | | B23B 27/10 |
| | | | 407/11 |
| 2016/0107284 A1* | 4/2016 | Haimer | B23Q 11/1023 |
| | | | 407/11 |
| 2016/0175938 A1* | 6/2016 | Kaufmann | B33Y 80/00 |
| | | | 407/11 |
| 2016/0236281 A1 | 8/2016 | Kitagawa | |
| 2019/0224761 A1 | 7/2019 | Amaya et al. | |

FOREIGN PATENT DOCUMENTS

| | | |
|---|---|---|
| DE | 10 2006 026 967 A1 | 12/2007 |
| DE | 10 2009 040 577 A1 | 4/2011 |
| DE | 102009040577 | 7/2015 |
| DE | 10 2017 131 368 A1 | 7/2018 |
| DE | 10 2017 209 442 A1 | 12/2018 |
| EP | 3150319 A1 | 4/2017 |
| WO | 2018/162185 A1 | 9/2018 |

OTHER PUBLICATIONS

English translation of Addendum to the Official Action dated Sep. 28, 2021 from German Patent Office dated Nov. 11, 2021.

* cited by examiner

INDEXABLE MILLING CUTTER WITH PRECISE COOLANT STREAMS

FIELD OF THE DISCLOSURE

In general, embodiments relate to cutting tools, and more particularly, to a lightweight cutting tool, such as a reamer, and the like, made of a composite material, including steel, carbon fiber, and the like, using additive manufacturing (i.e., 3D printing) to optimize the shape and distribution of material.

BACKGROUND OF THE DISCLOSURE

When trying to use a reamer to finish a large hole, for example, the tool can become very heavy. Heavy tools are problematic for operators who have to handle the tools. In addition, the time to accelerate and decelerate the tool to its desired speed decreases with reduced tool weight and moment of inertia. Further, many machines with automatic tool changers also have weight limits for tools the machine can changed. Thus, there is a need to minimize the weight of large toolholders to allow for easier handling and reduced operating costs.

Referring to FIGS. 11 and 12, there is shown a specific embodiment of a conventional milling cutter 120 with replaceable cutting inserts 122. The milling cutter 120 has a plurality of recesses 124 within the milling cutter body 126. The recesses 124 provide clearance for installation of cutting inserts 122, which are the cutting portion of the milling cutter 120 in that the cutting edge 128 of the cutting insert 122 engages the workpiece at the insert-chip interface, which is the location the cutting insert engages the workpiece.

Each recess 124 includes a seating surface 132 for seating of its corresponding cutting insert 122. The cutting insert 122 is held against the seating surface 132 by way of retention screw 134, which is threadedly engaged with an aperture 136 opening at the seating surface 132 of the milling cutter body 126. Projecting from the milling cutter body 126 is the shank 138 that operatively attaches to a rotating drive apparatus (not shown). The milling cutter 120 and rotating drive apparatus share a common axis of rotation illustrated by the dashed line AR-AR in FIG. 11. The shank 138 also provides a path for delivering coolant to the milling cutter 120.

Referring now to FIG. 12, which is a cross-sectional view of the milling cutter 120 of FIG. 11 taken along section line 12-12, that is along a center line of a coolant duct 150 contained in the milling cutter body 126. Coolant duct 150 has a diameter "A". The coolant duct 150 provides a passage for the travel of coolant from a centrally located coolant reservoir 152 within the milling cutter body 126 to the recess 124. The coolant reservoir 152 contains a supply of coolant. At the exit end 154 of the coolant duct 150 is a coolant spray nozzle 160, which is adjacent recess 124. The coolant duct 150 further has an entrance end 156 adjacent to or in the vicinity of the reservoir 152.

Referring to the operation of the specific embodiment of the conventional milling cutter using the coolant spray nozzle 160, the coolant is supplied under pressure from a coolant source 112 (shown in a schematic fashion) to flow into the coolant reservoir 152 from where the coolant flows into and through the coolant duct 50 into the coolant spray nozzle 60. The coolant flows through the coolant spray nozzle 60 and coolant discharges under pressure in a fan-shaped coolant spray 114 that impinges the intersection between the cutting edge 128 of the cutting insert 122 and the workpiece 116, thereby delivering coolant to the insert-chip interface.

Unfortunately, due to the geometrical restrictions, the coolant channel is usually large in diameter, and the exiting coolant stream typically aims above the cutting insert and is not able to target all the critical cutting areas of the cutting insert. As a result, there is poor effective cooling of the cutting insert and a relatively large amount of coolant waste is generated.

SUMMARY OF THE DISCLOSURE

A problem of poor effective cooling and large coolant waste can be solved by forming a coolant reservoir for each cutting insert that extends from a coolant manifold to a predetermined distance from the outer surface of the flute. Then, multiple, coolant holes or ducts, each having a relatively smaller cross-sectional area than the coolant reservoir, are formed extending from the flute outer surface to a bottom surface of the coolant reservoir, thereby effectively cooling a critical cutting area of the cutting insert, while reducing coolant waste.

In one aspect, a rotary cutting tool comprises an adapter including an internal main coolant passage and a secondary coolant passage extending from the internal main coolant passage to a forward end surface of the adapter; and a milling cutter attached to the adapter. The milling cutter comprises a milling cutter body with a plurality of flutes and a plurality of seating surfaces adapted to mount a cutting insert thereon, the milling cutter body further comprising a pilot bore adapted to receive the pilot of the adapter; a coolant manifold in fluid communication with the internal main coolant passage of the adapter. At least one coolant reservoir is in fluid communication with the coolant manifold. A plurality of coolant ducts are in fluid communication with the at least one coolant reservoir for providing a stream of coolant targeted at a plurality of specific critical cutting areas of the cutting insert. The at least one coolant reservoir lies along a circular intersection line of a coolant manifold. In addition, the at least one coolant reservoir has a longitudinal axis, wherein the longitudinal axis of the at least one coolant reservoir is oriented at a non-zero angle, A, with respect to a central, longitudinal axis of the milling cutter. Further, each coolant duct has a cross-sectional area less than a cross-sectional area of the at least one coolant reservoir.

In another aspect, a rotary cutting tool comprises an adapter including an internal main coolant passage and a secondary coolant passage extending from the internal main coolant passage to a forward end surface of the adapter; and a milling cutter attached to the adapter. The milling cutter comprises a milling cutter body with a plurality of flutes and a plurality of seating surfaces adapted to mount a cutting insert thereon, the milling cutter body further comprising a coolant manifold in fluid communication with the internal main coolant passage of the adapter. A plurality of coolant reservoirs are in fluid communication with the coolant manifold. A plurality of coolant ducts are in fluid communication with each coolant reservoir for providing a stream of coolant targeted at a plurality of specific critical cutting areas of the cutting insert. A bottom of each coolant reservoir ends at a predetermined distance, D, from each flute of the milling cutter, and wherein the predetermined distance, D, is in a range between about 0.5 mm and about 2.0 mm In yet another aspect, a milling cutter comprises a milling cutter body with a plurality of flutes and a plurality of seating surfaces adapted to mount a cutting insert thereon. The milling cutter body includes a coolant manifold in fluid communication with an internal main coolant passage of an adapter. A plurality of coolant reservoirs are in fluid communication with the coolant manifold, and a plurality of coolant ducts are in fluid communication with each coolant reservoir for providing a stream of coolant targeted at a plurality of specific critical cutting areas of the cutting insert. Each coolant reservoir lies along a circular intersection line of a coolant manifold. In addition, each coolant reservoir has a longitudinal axis, wherein a longitudinal axis of each coolant reservoir is oriented at a non-zero angle, A, with respect to a central, longitudinal axis of the milling cutter. Further, each coolant duct has a cross-sectional area less than a cross-sectional area of each coolant reservoir.

BRIEF DESCRIPTION OF THE DRAWINGS

While various embodiments are illustrated, the particular embodiments shown should not be construed to limit the claims. It is anticipated that various changes and modifications may be made without departing from the scope of this disclosure.

DETAILED DESCRIPTION

Figure 1:
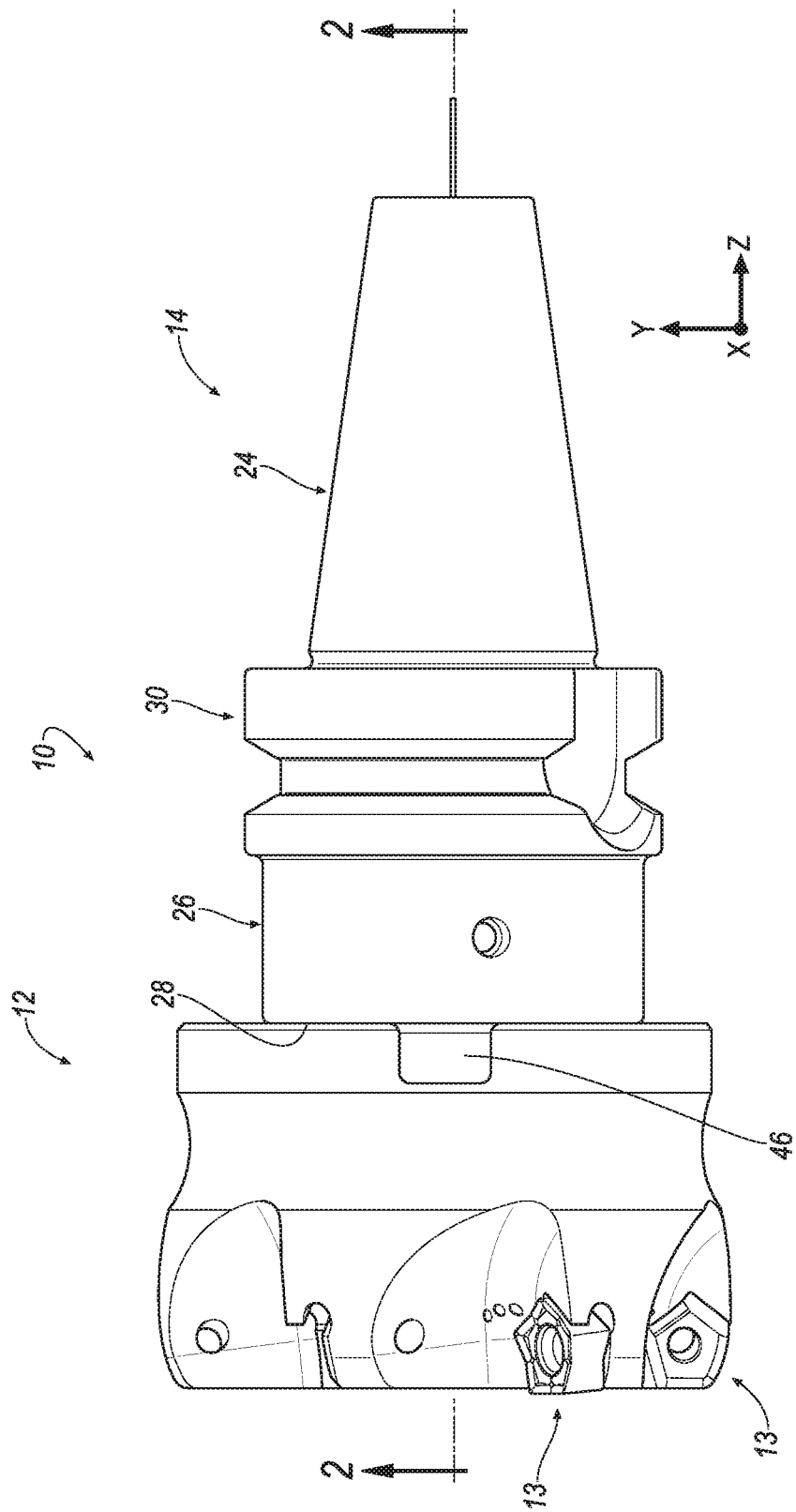
FIG. 1 is a side view of a rotary cutting tool, such as an indexable milling cutter according to an embodiment when attached to a tapered adapter.
Figure 2:
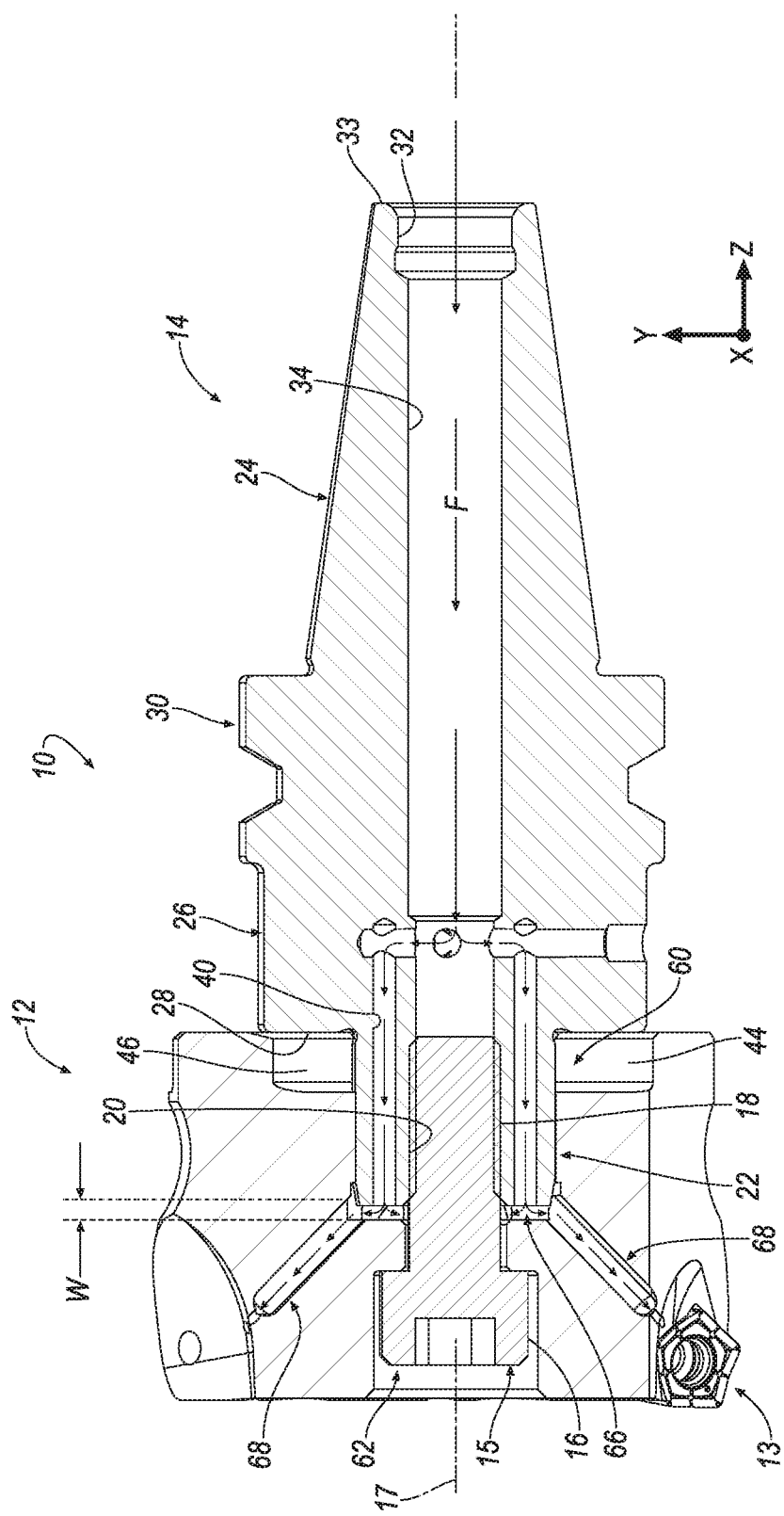
FIG. 2 is a cross-sectional view of the rotary cutting tool taken along line 2-2 of FIG. 1.

Referring now to FIGS. 1 and 2, a rotary cutting tool 10 is shown according to an embodiment. In general, the rotary cutting tool 10 comprises a milling cutter 12 with at least one cutting insert 13 mounted thereon, and a tapered adapter 14. A threaded fastener 15 can be used to attach the milling cutter 12 to the tapered adapter 14. The milling cutter 10 includes a central, longitudinal axis (i.e., z-axis) 17. The central, longitudinal axis 17 is generally the rotational axis of the rotary cutting tool 10. The threaded fastener 15 includes a head portion 16 and a threaded portion 18. The milling cutter 12 has threads 20 to allow the fastener 15 to be threaded into the milling cutter 12. The milling cutter 12 can be placed on a pilot 22 of the tapered adapter 14 and the threaded fastener 15 can be threaded into the tapered adapter 14 to secure the milling cutter 12 to the tapered adapter 14.

In the illustrated embodiment, the rotary cutting tool comprises a milling cutter 12 and a tapered adapter 14. However, it will be appreciated that principles as broadly contemplated herein can be applied to any type of rotary cutting tool, such as a boring bar, drill, and the like. In addition, it will be appreciated that principles as broadly contemplated herein can be applied to any type of adapter, such as a non-tapered, cylindrical, and the like.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by embodiments. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" is defined as something that is longer than it is wide. In other words, the width is smaller than its length.

As used herein, the term "circular" is defined as an object having a shape of a circle, i.e., an object having a simple closed shape. It is the set of points in a plane that are at a given distance from a given point, the center; equivalently it is the curve traced out by a point that moves in a plane so that its distance from a given point is constant. The distance between any of the points and the center is called the radius.

As used herein, the term "fluid" is defined as a substance that has no fixed shape and yields easily to external pressure, such as a gas or a liquid.

As used herein, the term "3D printing" is any of various processes in which material is joined or solidified under computer control to create a three-dimensional object, with material being added together, such as liquid molecules or powder grains being fused together, typically layer by layer. In the 1990s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, the term "hole" is defined as an opening trough something; a gap; a cavity or an aperture that can have any cross-sectional shape.

As used herein, the phrase "critical area of the cutting insert" is defined as an area of the chip/insert interface in which coolant is delivered.

As used herein, the term "manifold" is defined as a pipe or chamber branching into several openings.

As used herein, the term "reservoir" is defined as a receptacle or chamber for holding a liquid or fluid.

As used herein, the term "duct" is defined as any tube, canal, pipe, or conduit by which a fluid, air or other substance is conducted or conveyed.

Referring to FIGS. 1 and 2, the tapered adapter 14 engages a mounting system (not shown) of a machine tool (not shown) as is known. The adapter 14 includes a tapered shank portion 24 adapted for engaging the machine tool and a non-tapered shank portion 26 having a forward end surface 28. The pilot 22 extends outwardly from the forward end surface 28 and is concentric about the central, longitudinal axis 17 when the rotary cutting tool 10 is assembled, as shown in FIG. 2. The adapter 14 further includes an intermediate flange 30 disposed between the tapered shank portion 24 and the non-tapered shank portion 26 for automatic handling of the tapered adapter 14.

A threaded hole 32 may be disposed within a rearward end surface 33 of the tapered shank portion 24 for attaching the adapter 14 to the machine tool. As shown, the tapered adapter 14 is a CV-type adapter manufactured by Kennametal Inc. However, it is to be appreciated that the adapter 14 may be of any type known by those of ordinary skill in the art to be suitable for mounting a rotating tool to a machine tool, such as DV-, BT- or KM-type adapters manufactured by Kennametal Inc., CAPTO (Coromant) type adapters, or HSK-type adapters.

In the illustrated embodiment, the tapered adapter 14 includes an internal main coolant passage 34 extending through the adapter 14 for providing a flow of fluid, such as coolant, and the like, from the machine tool to the milling cutter 12. An annular or ring-shaped secondary coolant passage 40 disposed within the pilot 22 is in fluid communication with the internal main coolant passage 34. The secondary coolant passage 40 extends from the internal main coolant passage 34 to a forward end surface 42 of the pilot 22. Thus fluid, such as coolant, can travel entirely through the adapter 14 along a coolant flow path, F, (indicated by the arrows) extending from the rearward end surface 33 to the forward end surface 41, as shown in FIG. 2. In addition, the tapered adapter 14 includes a pair of round drive pins 44, 46 disposed on and extending from the forward end surface 28.

In the illustrated embodiment of FIGS. 1 and 2, a total of five (5) cutting inserts 13 are mounted on the cutting body 12 of the rotary cutting tool 10. As is known, the cutting inserts 13 are indexable. Thus, the milling cutter 12 is also known as an indexable milling cutter. Further, it will be appreciated that embodiments are not limited by the number of cutting inserts 13 that are mounted on the cutter body 12, and that principles broadly contemplated herein can be applied to a cutter body 12 in which any desirable number of cutting inserts 13 can be isometrically and/or tangentially mounted thereon.

Figure 3:
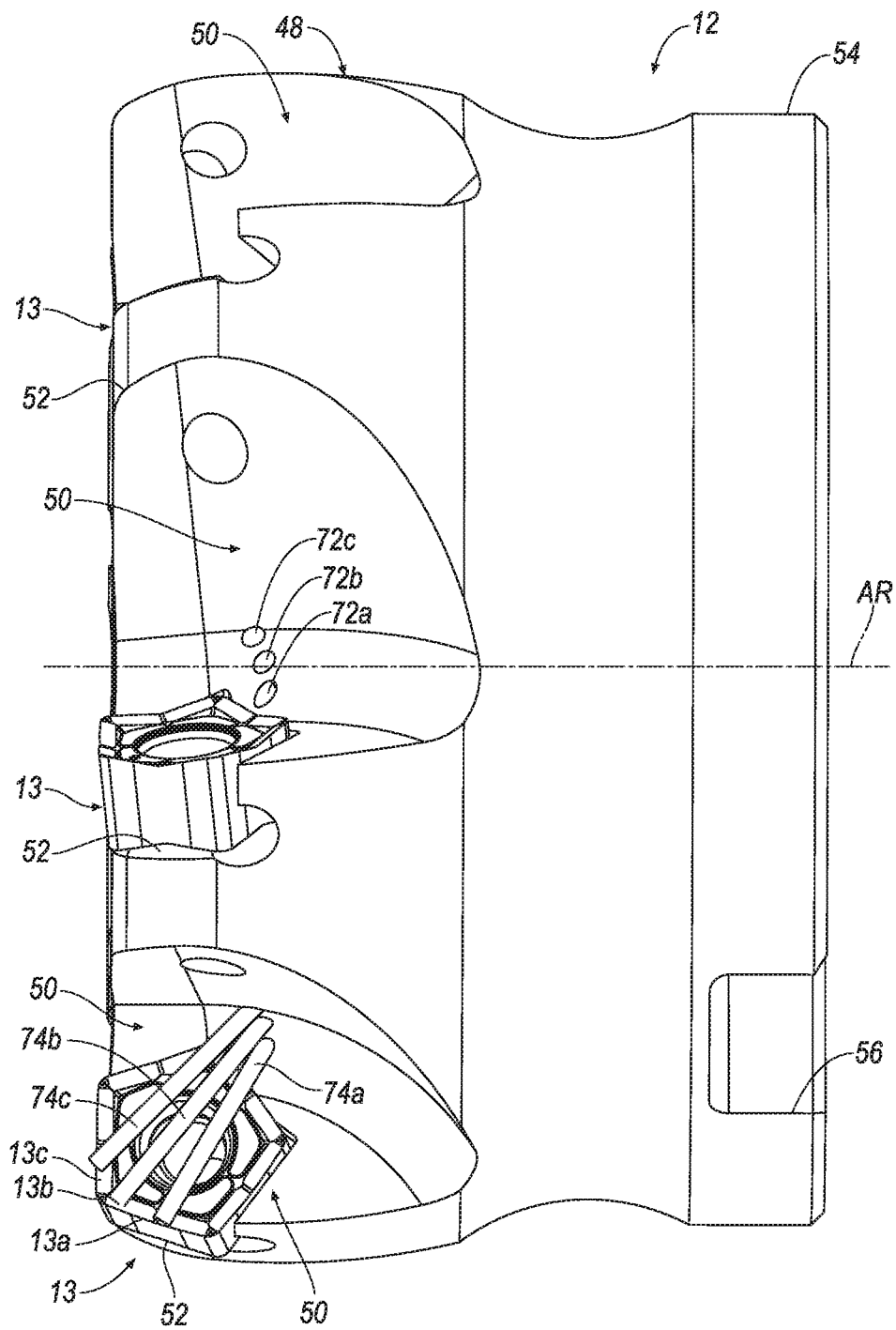
FIG. 3 is a side view of an indexable milling cutter with precise coolant streams targeting critical areas of the cutting insert according to an embodiment.
Figure 4:
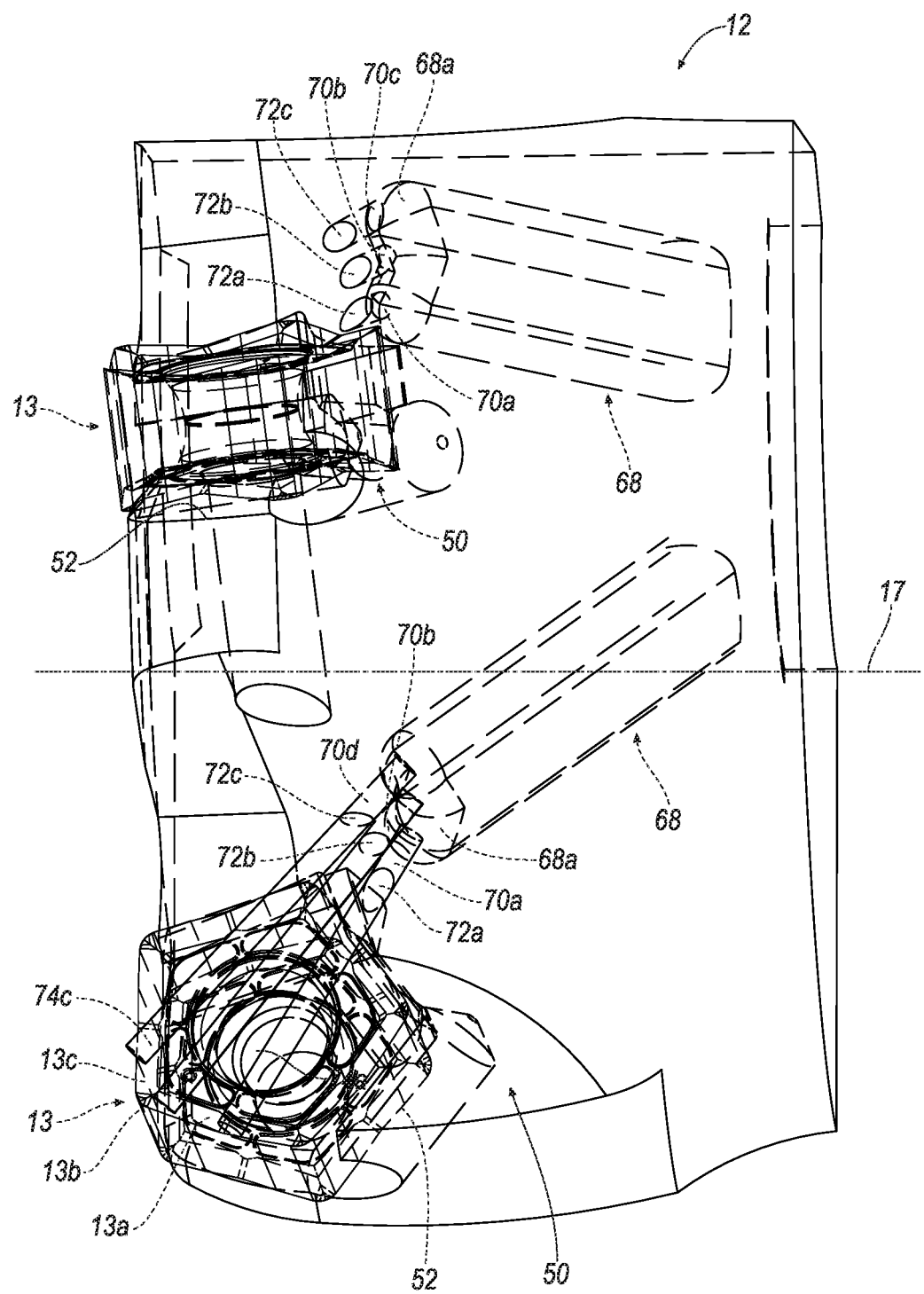
FIG. 4 is another side view of the milling cutter showing the coolant reservoirs, coolant ducts and outlet ports in phantom according to an embodiment.

As shown in FIGS. 3 and 4, the milling cutter 12 has a cutter body 48 with a plurality of flutes 50 formed therein. The flutes 50 provide clearance for installation of the cutting inserts 13 and assist in the evacuation of chips generated during a cutting operation. In the illustrated embodiment, the cutting inserts 13 are indexable, replaceable inserts made in whole or in part from, for example and without limitation, cemented carbides (e.g., tungsten (cobalt) cemented carbide that optionally can contain additives of titanium carbide, tantalum carbide and/or niobium carbide, ceramics (e.g., aluminum oxide, silicon aluminum oxynitride (SiAlON), superhard materials (e.g., cubic boron nitride) and cermets (e.g., titanium carbide-based materials). Thus, the milling cutter 12 is also known as an indexable milling cutter. Each cutting insert 13 includes one or more main cutting edges 13a that engage the workpiece (not shown) at the insert-chip interface. In addition, each cutting insert 13 includes one or more cutting corners 13b and one or more wiper facets 13c.

In the illustrated embodiment, each cutting insert 13 is polygon-shaped having a total of five (5) main cutting edges 13a, cutting corners 13b and wiper facets 13c. Thus, each cutting insert 13 can be indexed by rotating the cutting insert 13 by about 72 degrees around its central axis such that a different main cutting edge 13a engages the workpiece during a cutting operation. However, it will be appreciated that embodiments are not limited by the number of main cutting edges, wiper facets and cutting corners, and that embodiments can be practiced with a cutting insert having any desirable number of main cutting edges, wiper facets and cutting corners. For example, the cutting insert 13 can be trigonal, rectangular, hexagonal, octagonal, and the like. In another example, the cutting insert 13 can be round having only a single main cutting edge 13a and an optional wiper facet 13c, and the cutting corner 13b can be eliminated.

Figure 5:
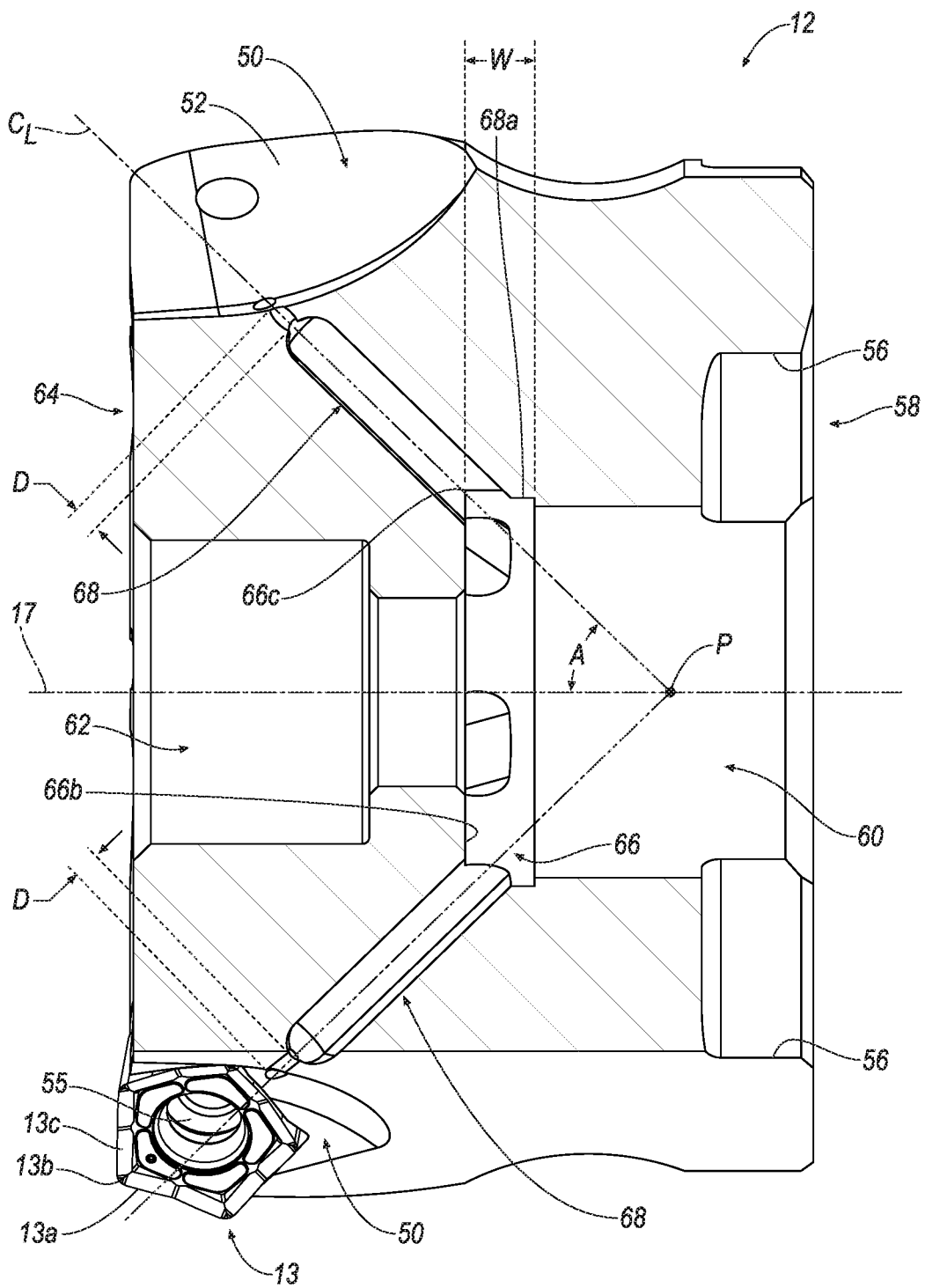
FIG. 5 is a cross-sectional view of the milling cutter taken along the central, longitudinal axis of the milling cutter showing the pilot bore, the fastener bore, the coolant manifold and the coolant reservoirs in fluid communication with the coolant manifold according to an embodiment.

A seating surface 52 is provided proximate each flute 50 for seating of its corresponding cutting insert 13. As is known, the cutting insert 13 is held against the seating surface 52 by way of a retention screw 53 (FIG. 9), which is threadedly engaged with an aperture 55 (FIG. 5) formed in the seating surface 52 of the milling cutter body 48. A shank 54 extends rearwardly outward to enable the milling cutter 12 to be operatively attached to the adapter 14, as described above. The shank 54 includes one or more driving pin recesses 56 adapted to accommodate a respective driving pin 44, 46 of the adapter 14. The recesses 56 are formed in a rearward end surface 58 of the milling cutter 12, as shown in FIG. 5. When the milling cutter 12 is attached to the adapter 14, the milling cutter 12 and the adapter 14 share a common axis of rotation (i.e., collinear) with the central, longitudinal axis 17 of the rotary cutting tool 10, as shown in FIG. 2.

Referring now to FIG. 5, the milling cutter 12 includes a pilot bore 60 formed in the rearward end surface 58 of the milling cutter 12 adapted to receive the pilot 22 of the adapter 14. In addition, the milling cutter 12 includes a fastener bore 62 formed in a forward end surface 64 of the milling cutter 12 adapted to receive the threaded fastener 15.

A coolant manifold 66 is formed between the pilot bore 60 and the fastener bore 62. The coolant manifold 66 is defined by a cylindrical side wall 66a having a width, W, and a substantially planar bottom surface 60b that intersects the side wall 66a at a circular line of intersection 66c, as shown in FIGS. 5-7.

In one aspect, the milling cutter 12 includes a plurality of coolant reservoirs 68 in fluid communication with the coolant manifold 66, as shown in FIGS. 2 and 4-7. Specifically, there is a one-to-one correspondence between the number of cutting inserts 13 and the number of reservoirs 68. In other words, the number of coolant reservoirs 68 is equal to the number of cutting inserts 13. Thus, in the illustrated embodiment, there are a total of five (5) coolant reservoirs 68 (i.e., one coolant reservoir 68 for each cutting insert 13) that are in fluid communication with the coolant manifold 66. However, it will be appreciated that the invention is not limited by the number of coolant reservoirs 68, and that the invention can be practiced with the number of coolant reservoirs 68 different than the number of cutting inserts 13. For example, it is envisioned that the invention can be practiced with a single coolant reservoir 68 that is disposed up to about 360 degrees about the axis of rotation, AR, of the milling cutter 12.

Figure 6:
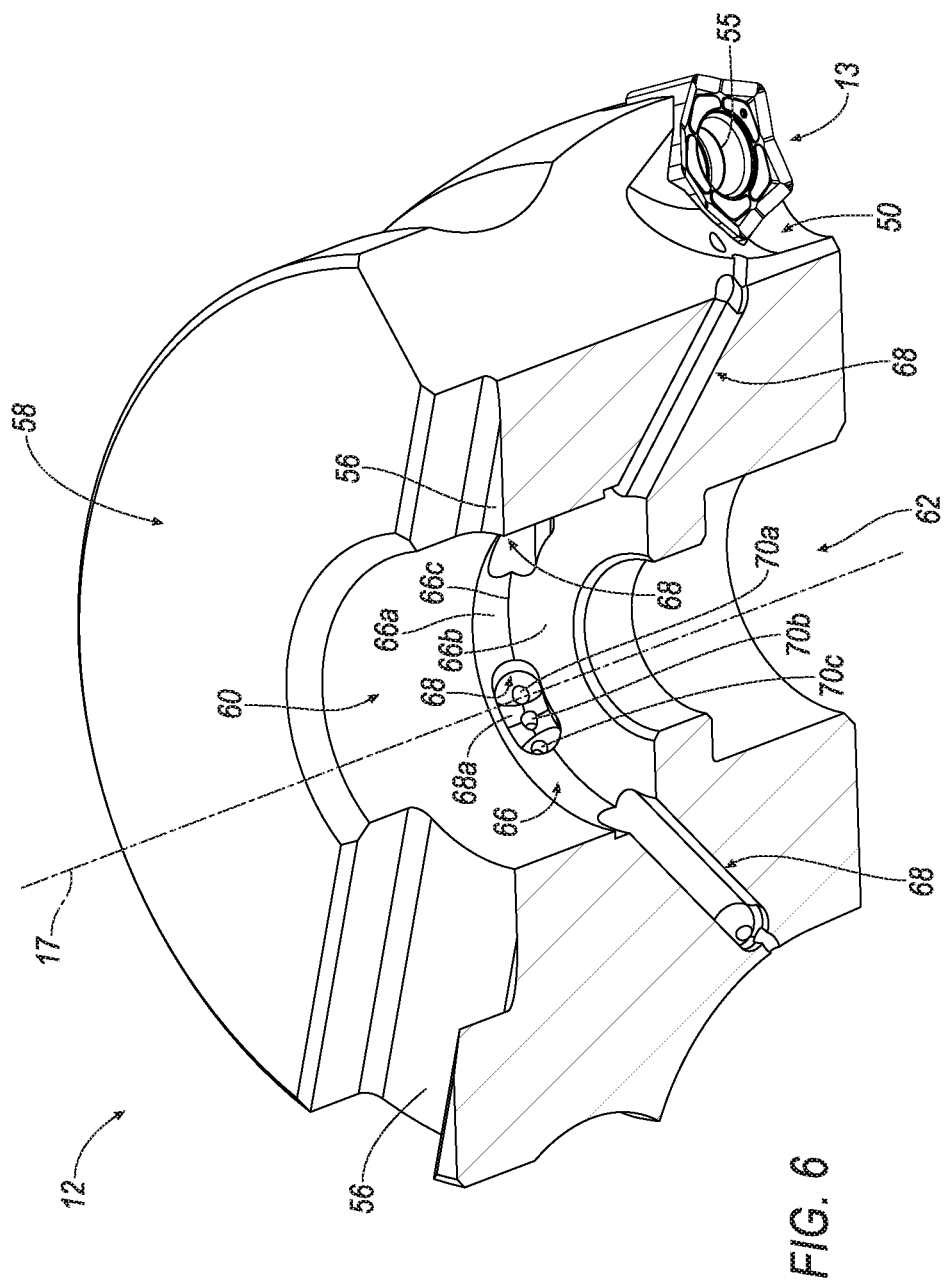
FIG. 6 is a rear, partial cross-sectional view of the milling cutter showing the pilot bore, the coolant manifold, and the coolant reservoirs in fluid communication with the coolant manifold according to an embodiment.
Figure 7:
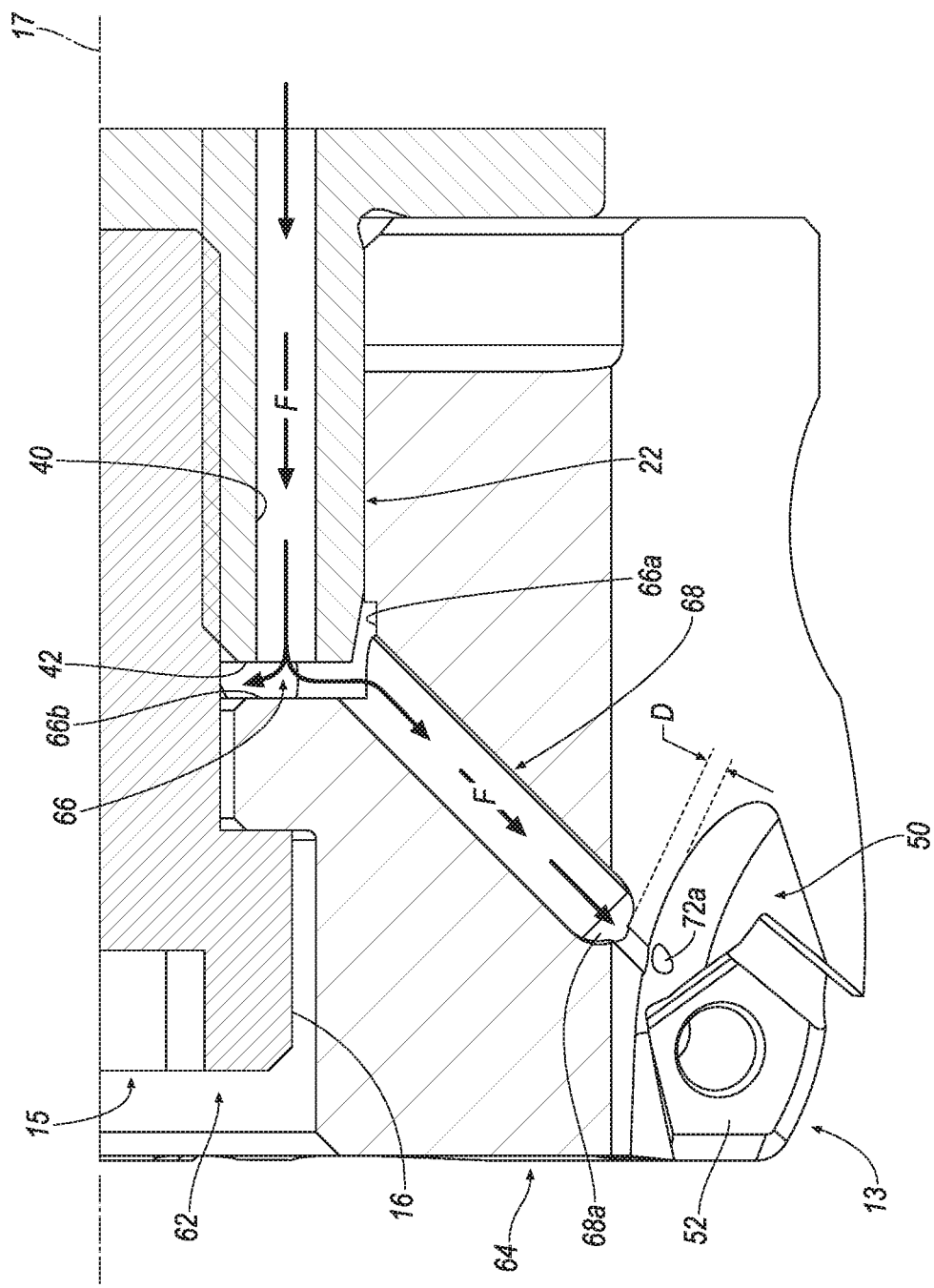
FIG. 7 is an enlarged, cross-sectional view of the flow path of coolant into the pilot of the adapter, through the coolant manifold, and into one of the coolant reservoirs of the milling cutter according to an embodiment.

As best shown in FIG. 6, the coolant reservoirs 68 are equally spaced about the central, longitudinal axis 17 of the milling cutter 12. In the illustrated embodiment, each of the five coolant reservoirs 68 are equally spaced about 72 degrees (i.e., 360/5) with respect to each other about the central, longitudinal axis 17 of the milling cutter 12. As shown in FIG. 6, each coolant reservoir 68 is in fluid communication with the coolant manifold 66. Specifically, each coolant reservoir 68 is formed along the circular line of intersection 66c between the cylindrical side surface 66a and the bottom surface 66b of the coolant manifold 66.

Further, each coolant reservoir 68 is oriented at a non-zero angle, A, with respect to the central, longitudinal axis 17 of the milling cutter 12, as shown in FIG. 5. In one embodiment, each coolant reservoir 68 is oriented at an angle, A, of between about 15 degrees and about 65 degrees, depending on the dimensions of the milling cutter 12. Each coolant reservoir 68 has a central, longitudinal axis, CL, that intersect at a point, P, on the central, longitudinal axis 17 of the milling cutter 12. In addition, each coolant reservoir 68 has a curved bottom surface 68a, as shown in FIG. 4.

Referring to FIG. 5, each coolant reservoir 68 can be manufactured by machining a cavity from the pilot bore 60 toward the seating surface 52 of a respective cutting insert 13, and ending at a predetermined distance, D, from the flute 50. In other words, the bottom 68a of each coolant reservoir 68 ends at the predetermined distance, D, from the flute 50. In one embodiment, the distance, D, is between about 0.5 mm to about 2.0 mm. For example, the distance, D, can be about 1.0 mm. The cavity can be machined using traditional CNC machining methods using a ball nose endmill, a drill, or a combination of both.

In addition, each coolant reservoir 68 has a non-circular in cross-sectional shape, as shown in FIGS. 5 and 6. For example, each coolant reservoir 68 has an elongated or elliptical cross-sectional shape. However, it should be appreciated that the embodiments are not limited by the cross-sectional shape of each coolant reservoir, and that embodiments can be practiced with one or more coolant reservoirs having a circular cross-sectional shape and one or more coolant reservoirs 68 having a non-circular cross-sectional shape.

In another aspect, the milling cutter 12 includes a plurality of coolant ducts 70 disposed within the milling cutter body 48, as shown in FIG. 4. In the illustrated embodiment, the milling cutter body 48 has three coolant ducts 70a, 70b, 70c in fluid communication with a respective coolant reservoir 68. Each coolant duct 70a, 70b, 70c extends from its respective coolant reservoir 68 to a respective outlet port 72a, 72b, 72c in the flute 50 proximate a respective cutting insert 13.

Each coolant duct 70a, 70b, 70c produces a targeted stream of coolant 74a, 74b, 74c from its respective outlet port 72a, 72b, 72c. Thus, in the illustrated embodiment, the milling cutter 12 produces a total of three (3) streams of coolant that are targeted at different critical cutting areas of the cutting insert 13. For example, the coolant duct 70a produces a stream of coolant 74a targeting the main cutting edge 13a of the cutting insert 13, the coolant duct 70b produces a stream of coolant 74b targeting the cutting corner 13b of the cutting insert 13, and the coolant duct 70c produces a stream of coolant 74c targeting the wiper facet 13c of the cutting insert 13, as shown in FIGS. 3 and 4.

Each coolant duct 70a, 70b, 70c and each outlet port 72a, 72b, 72c can be manufactured by forming a hole extending from the flute 50 to its respective coolant reservoir 68. Thus, both the coolant reservoir 68 and the coolant ducts 70a, 70b, 70c can be manufactured using conventional CNC machining methods using a ball nose endmill, a drill, or a combination of both without bottlenecks. In the illustrated embodiment, the coolant ducts 70a, 70b, 70c have a substantially circular cross-sectional shape. However, it will be appreciated that embodiments are not limited by the cross-sectional shape of the coolant ducts, and that embodiments can be practiced with coolant ducts having a non-circular cross-sectional shape.

Each coolant duct 70a, 70b, 70c can have a diameter in a range between about 0.5 mm to about 5.0 mm. The coolant ducts 70a, 70b, 70c can have the same diameter. For example, each coolant duct 70a, 70b, 70c can have a diameter of about 1.0 mm. Alternatively, one or more coolant ducts can have a different diameter. For example, one coolant duct can have a diameter of about 1.0 mm and another coolant duct can have a diameter of about 1.5 mm. In any event, each coolant duct 70a, 70b, 70c has a smaller cross-sectional area than the cross-sectional area of the coolant reservoirs 68, thereby increasing coolant pressure.

In addition, the total cross-sectional area of the coolant ducts 70a, 70b, 70c have a smaller total cross-sectional area than the total cross-sectional area of the coolant reservoir 68. As a result, the milling cutter 12 uses less coolant, as compared to a single coolant duct having a relatively larger cross-sectional area. For example, if the three coolant ducts 70a, 70b, 70c have a diameter of 1.0 mm, then the total cross-sectional area is less than a single coolant duct having a diameter of 3.0 mm (i.e., three times the diameter of each of the three coolant ducts 70a, 70b, 70c).

In the case of three coolant ducts having a diameter of 1.0 mm, the total cross-sectional area is as follows:

Area $(3 \times 1.0 \text{ mm holes}) = (3)\pi(0.5^2) = 0.75\ \pi$,

In the case of a single coolant duct having a diameter of 3.0 mm, the total cross-sectional area is as follows:

Area $(1 \times 3.0 \text{ mm hole}) = \pi(1.5^2) = 2.25\ \pi$.

Thus, the total cross-sectional area for three coolant ducts 70a, 70b, 70c, each duct having a diameter of 1.0 mm is smaller than the total cross-sectional area of a single coolant duct having a diameter of 3.0 mm. As a result, the milling cutter 12 with three coolant ducts uses less coolant than a conventional cutting tool with only a single, relatively larger coolant duct.

In the case of three coolant ducts 70a, 70b, 70c having a diameter of 1.5 mm, the total cross-sectional area is still less than having a single coolant duct with a diameter of 3.0 mm (i.e., two times the diameter of each of the three coolant ducts 70a, 70b, 70c).

In the case of three coolant ducts having a diameter of 1.5 mm, the total cross-sectional area is as follows:

Area $(3 \times 1.5 \text{ mm holes}) = (3)\pi(0.75^2) = 1.69\ \pi$.

In the case of a single coolant duct having a diameter of 3.0 mm, the total cross-sectional area is as follows:

Area $(1 \times 3.0 \text{ mm hole}) = \pi(1.5^2) = 2.25\ \pi$.

Thus, the total cross-sectional area for three coolant ducts 70a, 70b, 70c, each duct having a diameter of 1.5 mm is still smaller than the total cross-sectional area of a single coolant duct having a diameter of 3.0 mm. As a result, the milling cutter 12 with three coolant ducts uses less coolant than a conventional cutting tool with only a single, relatively larger coolant duct.

As shown in FIG. 2, a flow, F, of fluid, such as coolant, and the like, enters into the main coolant passage 34 formed in the rearward end surface 33 of the tapered adapter 14. Then, the coolant travels from the internal main coolant passage 34 and into the annular-shaped secondary coolant passage 40 disposed in the pilot 22, through a respective coolant reservoir 68, into the coolant ducts 70a, 70b, 70c. Then, the coolant exits the outlet ports 72a, 72b, 72c in coolant streams 74a, 74b, 74c that are precisely directed to critical areas, such as the main cutting edge 13a, the cutting corner 13b and the wiper facet 13c of the cutting insert 13.

It should be appreciated that embodiments are not limited by the number of coolant ducts, and that embodiments can be practiced with any number of a plurality of coolant ducts. In other words, embodiments can be practiced with any number of two or more coolant ducts, depending on the number of critical cutting areas that should be targeted by the coolant ducts.

Figure 8:
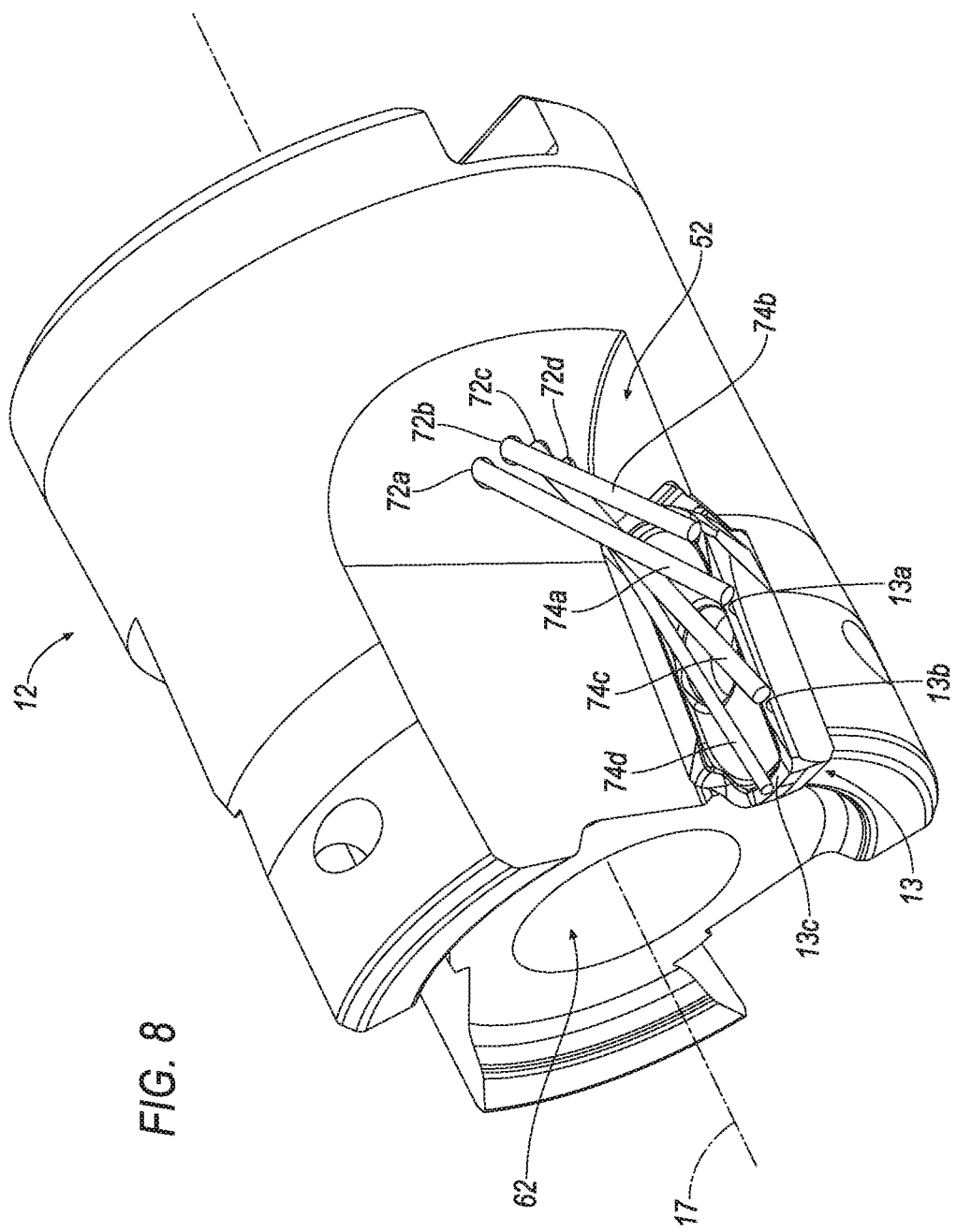
FIG. 8 is a front perspective view of a shoulder milling cutter with precise coolant streams targeting critical areas of the cutting insert according to an embodiment.
Figure 9:
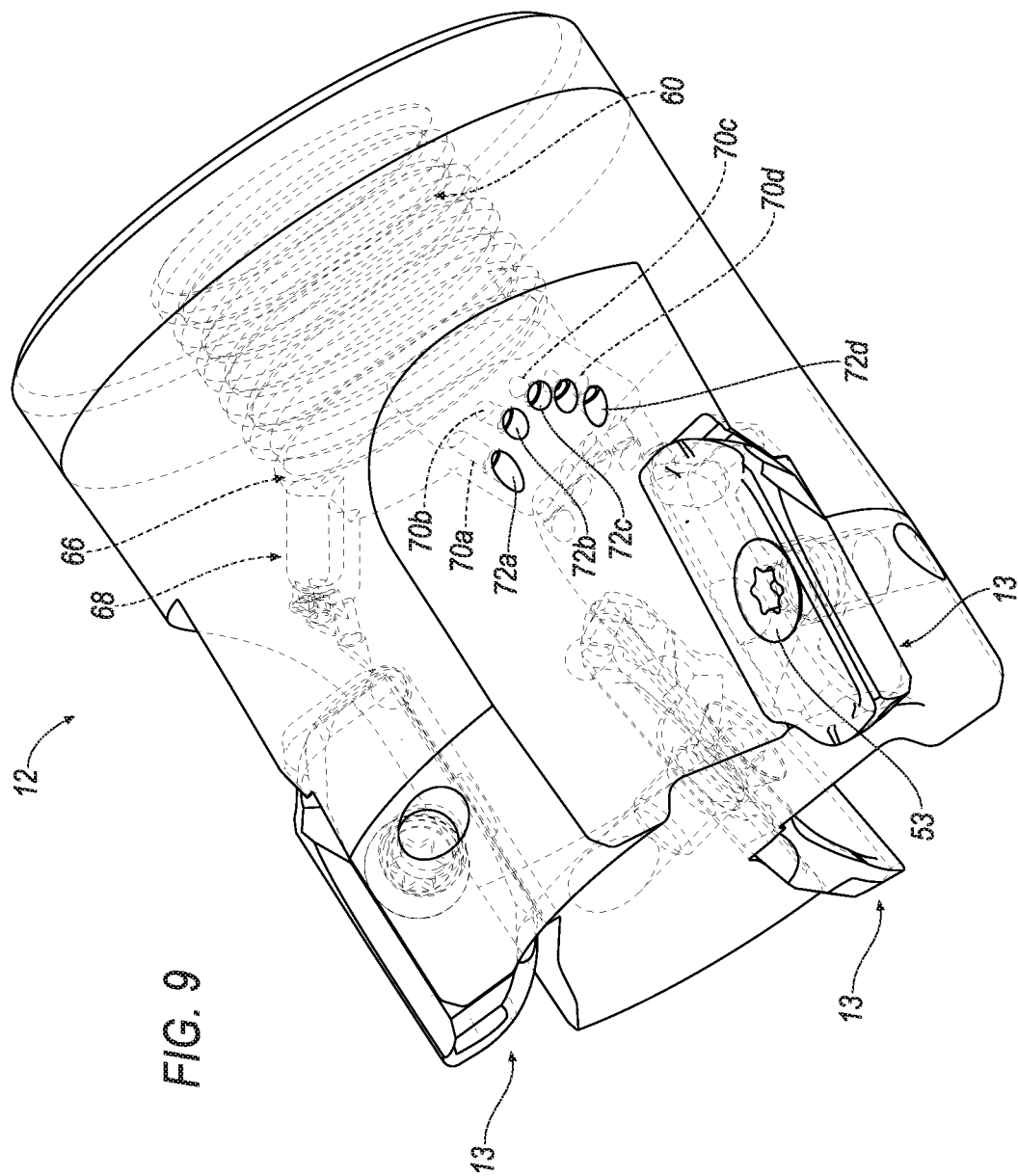
FIG. 9 is another front view of the shoulder milling cutter showing the coolant reservoirs, coolant ducts and outlet ports in phantom according to an embodiment.
Figure 10:
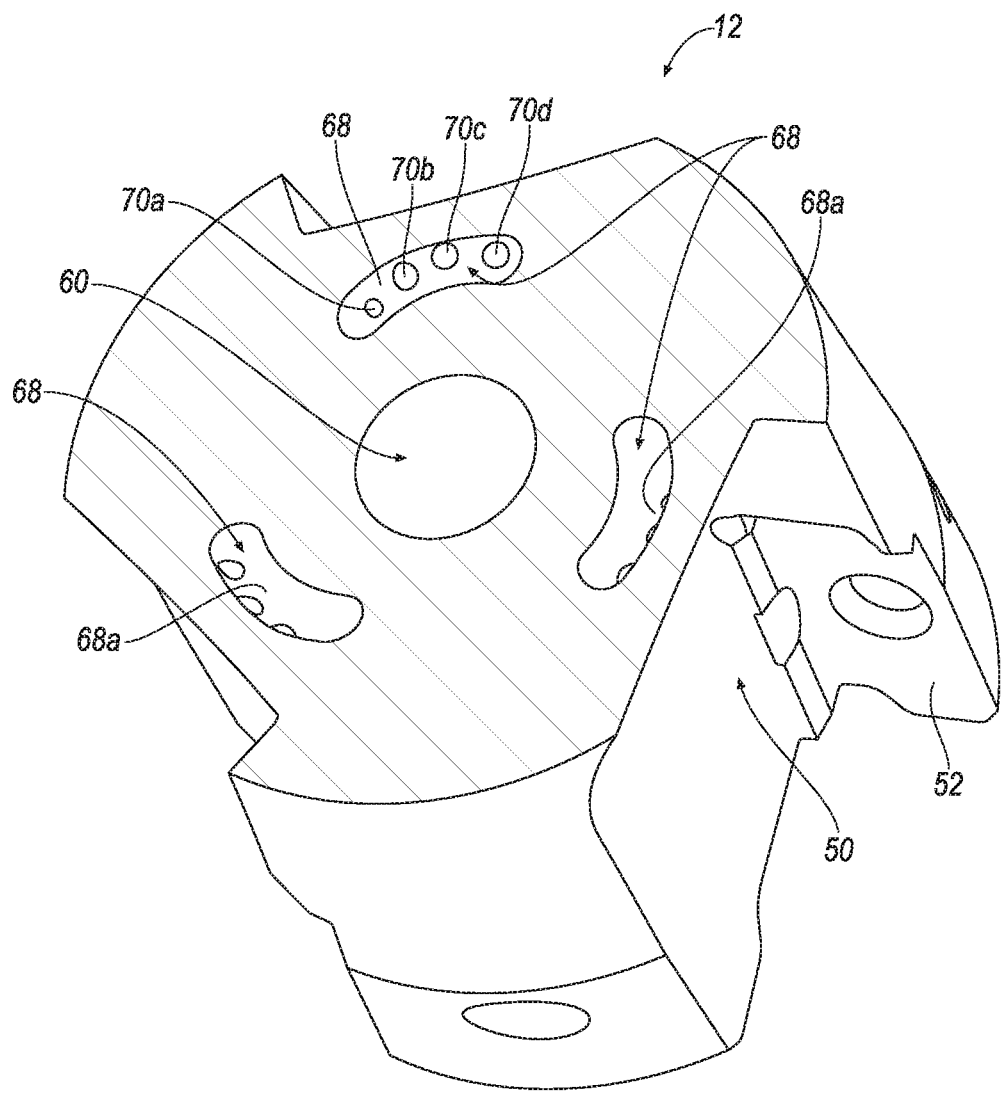
FIG. 10 is a rear perspective view of the shoulder milling cutter showing the pilot bore, the coolant reservoirs and the coolant ducts according to an embodiment.
Figure 11:
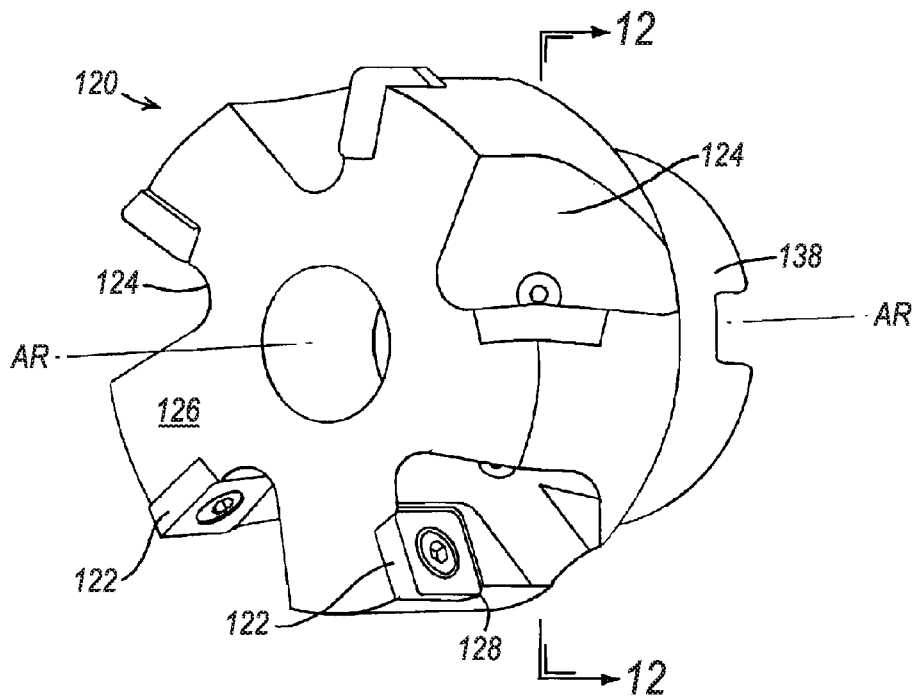
FIG. 11 is a perspective view of a conventional indexable milling cutter with coolant spray nozzles.
Figure 12:
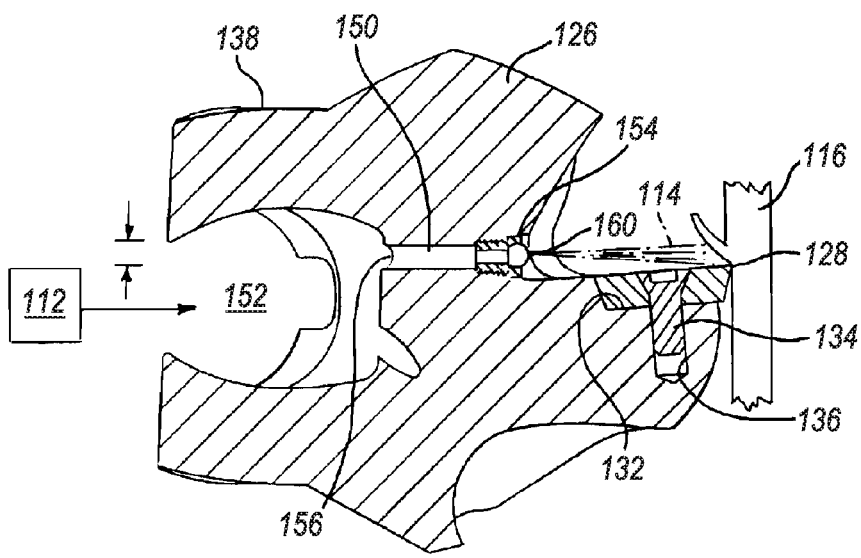
FIG. 12 is a cross-sectional view of the conventional indexable milling cutter taken along line 12-12 of FIG. 11.

For example, the principles can be practiced in a rotary cutting tool 10 comprising a shoulder milling cutter with four coolant ducts 70a-d and four outlet ports 72a-d that produce a total of four coolant streams 74a-d that target critical areas of the cutting insert 13, as shown in FIGS. 8 and 9. It should be understood that the coolant reservoirs 68 and the coolant ducts 70a-d in the embodiment shown in FIGS. 8 and 9 are manufactured in a similar manner as the coolant reservoirs 68 and the coolant ducts 70a, 70b, 70c of the earlier embodiment shown in FIGS. 1-7.

In the illustrated embodiment of FIGS. 8 and 9, the coolant duct 70a produces a stream of coolant 74a from outlet port 72a targeting a first portion of the main cutting edge 13a of the cutting insert 13, the coolant duct 70b produces a stream of coolant 74b targeting the cutting corner 13b of the cutting insert 13, the coolant duct 70c produces a stream of coolant 74c targeting the wiper facet 13c of the cutting insert 13, and the coolant duct 70d produces a stream of coolant 74d from outlet port 72d targeting a second portion of the main cutting edge 13a.

It should also be noted that the four coolant ducts 70a-d have a smaller cross-sectional area, and therefore use less coolant, than a conventional cutting tool having a single coolant duct with a relatively larger diameter. For example, if one coolant duct has a diameter of 1.0 mm and three coolant ducts have a diameter of 1.5 mm, then the cross-sectional area is less than a single coolant duct having a diameter of 3.5 mm.

In the case in which one coolant duct has a diameter of 1.0 mm and three coolant ducts have a diameter of 1.5 mm:

Area $(1 \times 1.0 \text{ mm hole} + 3 \times 1.5 \text{ mm hole}) = \pi(0.5^2) + 3\pi(0.75^2) = 1.94\ \pi$.

In the case of a single coolant duct having a diameter of 3.5 mm,

Area $(1 \times 3.5 \text{ mm hole}) = \pi(1.75^2) = 3.06\ \pi$.

Thus, the total area for four coolant ducts in which one coolant duct has a diameter of 1.0 mm and three coolant ducts have a diameter of 1.5 mm is still smaller than a single coolant duct having a diameter of 3.5 mm. As a result, the cutting tool uses less coolant than a conventional cutting tool having a single, larger coolant duct.

As described above, the rotary cutting tool 10 has a novel cooling technology with the following advantages:

1) effective cooling with less coolant consumption;
2) increased coolant pressure;
3) multiple precisely targeted coolant streams per flute; and
4) feasible and economical manufacturing process with no bottlenecks.

Having described presently preferred embodiments, the disclosure may be otherwise embodied within the scope of the appended claims.

What is claimed is:

1. A rotary cutting tool, comprising:
    an adapter including a pilot, an internal main coolant passage and a secondary coolant passage extending from the internal main coolant passage to a forward end surface of the adapter; and a milling cutter attached to the adapter, the milling cutter comprising:
a milling cutter body with a plurality of flutes and a plurality of seating surfaces adapted to mount a cutting insert thereon, the milling cutter body further comprising a pilot bore adapted to receive the pilot of the adapter, and a fastener bore formed in a forward end surface adapted to receive a threaded fastener;
a coolant manifold formed between the pilot bore and the fastener bore and in fluid communication with the secondary coolant passage of the adapter, the coolant manifold defined by a cylindrical side wall having a width, W, and a bottom surface that substantially perpendicularly intersects with the side wall at a circular line of intersection defining an imaginary circle, the coolant manifold extending radially outward with respect to the pilot bore;
at least one coolant reservoir in fluid communication with the coolant manifold; and
a plurality of coolant ducts in fluid communication with the at least one coolant reservoir for providing a stream of coolant targeted at a plurality of specific critical cutting areas of the cutting insert,
wherein the at least one coolant reservoir has a longitudinal axis that, when viewed in a rear, partial cross-sectional view of the milling cutter, lies on the imaginary circle defined by the circular line of intersection of the coolant manifold,
wherein the longitudinal axis of the at least one coolant reservoir is oriented at a non-zero angle, A, with respect to a central, longitudinal axis of the milling cutter, and
wherein a total cross-sectional area of the plurality of coolant ducts is less than a cross-sectional area of the at least one coolant reservoir.

2. The rotary cutting tool of claim 1, wherein a total number of coolant reservoirs is equal to a total number of cutting inserts.

3. The rotary cutting tool of claim 1, wherein a plurality of coolant reservoirs are equally spaced about the central, longitudinal axis of the milling cutter.

4. The rotary cutting tool of claim 1, wherein the milling cutter comprises a shoulder milling cutter.

5. The rotary cutting tool of claim 1, wherein the secondary coolant passage is annular in cross-sectional shape.

6. The rotary cutting tool of claim 1, wherein a bottom of the at least one coolant reservoir ends at a predetermined distance, D, from each flute of the milling cutter.

7. The rotary cutting tool of claim 6, wherein the predetermined distance, D, is in a range between about 0.5 mm and about 2.0 mm.

8. The rotary cutting tool of claim 1, wherein the at least one coolant reservoir has a non-circular cross-sectional shape.

9. The rotary cutting tool of claim 1, wherein the plurality of specific critical cutting areas comprises at least two of a main cutting edge, a cutting corner and a wiper facet of the cutting insert.

10. A rotary cutting tool, comprising:
an adapter including a pilot, an internal main coolant passage and a secondary coolant passage extending from the internal main coolant passage to a forward end surface of the adapter; and
a milling cutter attached to the adapter, the milling cutter comprising:
a milling cutter body with a plurality of flutes and a plurality of seating surfaces adapted to mount a cutting insert thereon, the milling cutter body further comprising a pilot bore formed in a rearward end surface and adapted to receive the pilot of the adapter, and a fastener bore formed in a forward end surface and adapted to receive a threaded fastener;
a coolant manifold formed between the pilot bore and the fastener bore and in fluid communication with the secondary coolant passage of the adapter, the coolant manifold defined by a cylindrical side wall having a width, W, and a bottom surface that substantially perpendicularly intersects with the side wall at a circular line of intersection defining an imaginary circle, the coolant manifold extending radially outward with respect to the pilot bore;
a plurality of coolant reservoirs in fluid communication with the coolant manifold; and
a plurality of coolant ducts in fluid communication with each coolant reservoir for providing a stream of coolant targeted at a plurality of specific critical cutting areas of the cutting insert,
wherein the at least one coolant reservoir has a longitudinal axis that, when viewed in a rear, partial cross-sectional view of the milling cutter, lies on the imaginary circle defined by the circular line of intersection of the coolant manifold,
wherein a bottom of each coolant reservoir ends at a predetermined distance, D, from each flute of the milling cutter, and
wherein the predetermined distance, D, is in a range between about 0.5 mm and about 2.0 mm.

11. The rotary cutting tool of claim 10, wherein a circular line of intersection is defined by an intersection between a cylindrical side wall and a bottom surface of the coolant manifold, and wherein each coolant reservoir lies along the circular line of intersection.

12. The rotary cutting tool of claim 10, wherein each coolant reservoir has a longitudinal axis, and wherein the longitudinal axis of each coolant reservoir is oriented at a non-zero angle, A, with respect to a central, longitudinal axis of the milling cutter.

13. The rotary cutting tool of claim 10, wherein each coolant reservoir has a cross-sectional area, and wherein each coolant duct has a cross-sectional area less than the cross-sectional area of each coolant reservoir.

14. The rotary cutting tool of claim 10, wherein a total number of coolant reservoirs is equal to a total number of cutting inserts.

15. The rotary cutting tool of claim 10, wherein the plurality of coolant reservoirs are equally spaced about a central, longitudinal axis of the milling cutter.

16. A milling cutter, comprising:
a milling cutter body with a plurality of flutes and a plurality of seating surfaces adapted to mount a cutting insert thereon, the milling cutter body including a coolant manifold formed between a pilot bore and a fastener bore and in fluid communication with a secondary coolant passage of an adapter, the coolant manifold defined by a cylindrical side wall having a width, W, and a bottom surface that substantially perpendicularly intersects with the side wall at a circular line of intersection defining an imaginary circle, the coolant manifold extending radially outward with respect to the pilot bore;
a coolant reservoir in fluid communication with the coolant manifold, and a plurality of coolant ducts in fluid communication with the coolant reservoir for providing a stream of coolant targeted at a plurality of specific critical cutting areas of the cutting insert, wherein the coolant reservoir has a longitudinal axis that, when viewed in a rear, partial cross-sectional view of the milling cutter, lies on the imaginary circle defined by the circular line of intersection of the coolant manifold, wherein the coolant reservoir has a longitudinal axis, and wherein the longitudinal axis of the coolant reservoir is oriented at a non-zero angle, A, with respect to a central, longitudinal axis of the milling cutter, wherein the coolant reservoir has a cross-sectional area, and wherein the plurality of coolant ducts has a total cross-sectional area, and wherein the total cross-sectional area of the plurality of coolant ducts is less than the cross-sectional area of the coolant reservoir.

17. The milling cutter of claim 16, further comprising a plurality of coolant reservoirs, and wherein the plurality of coolant reservoirs are equally spaced about the central, longitudinal axis of the milling cutter.

18. The milling cutter of claim 16, wherein the milling cutter comprises a shoulder milling cutter.

19. The milling cutter of claim 16, wherein a bottom of the coolant reservoir ends at a predetermined distance, D, from each flute of the milling cutter in a range between about 0.5 mm and about 2.0 mm.

20. The milling cutter of claim 16, wherein the coolant reservoir has a non-circular cross-sectional shape.

21. The milling cutter of claim 16, wherein the plurality of specific critical cutting areas comprises at least two of a main cutting edge, a cutting corner and a wiper facet of the cutting insert.

22. The milling cutter of claim 16, wherein the circular line of intersection is defined by an intersection between a cylindrical side surface and a bottom surface of the coolant manifold.

* * * * *